US008024785B2

(12) United States Patent
Andress et al.

(10) Patent No.: US 8,024,785 B2
(45) Date of Patent: Sep. 20, 2011

(54) METHOD AND DATA PROCESSING SYSTEM FOR INTERCEPTING COMMUNICATION BETWEEN A CLIENT AND A SERVICE

(75) Inventors: Jiri Andress, Hamburg (DE); Stefan Heine, Haan (DE); Thomas von Kulessa, Hamburg (DE)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 11/620,218

(22) Filed: Jan. 5, 2007

(65) Prior Publication Data

US 2007/0174469 A1 Jul. 26, 2007

(30) Foreign Application Priority Data

Jan. 16, 2006 (EP) .................................. 06100369.5

(51) Int. Cl.
*G06F 21/24* (2006.01)
(52) U.S. Cl. .................. 726/12; 726/7; 726/11; 726/13; 726/22
(58) Field of Classification Search ........................ None
See application file for complete search history.

(56) References Cited

U.S. PATENT DOCUMENTS

| 4,446,337 | A | 5/1984 | Cofer |
| 5,428,667 | A | 6/1995 | Easterling et al. |
| 5,937,345 | A | 8/1999 | McGowan et al. |
| 6,122,499 | A | 9/2000 | Magnusson |
| 6,438,695 | B1 | 8/2002 | Maufer |
| 7,185,091 | B2 * | 2/2007 | Dorenbosch et al. ......... 709/224 |
| 7,382,881 | B2 * | 6/2008 | Uusitalo et al. ............... 380/262 |
| 7,587,757 | B2 * | 9/2009 | Scoggins et al. ................ 726/11 |
| 2001/0007975 | A1 * | 7/2001 | Nyberg et al. .................... 705/1 |
| 2002/0004819 | A1 | 1/2002 | Agassy et al. |

(Continued)

FOREIGN PATENT DOCUMENTS

WO WO 99/17499 4/1999

OTHER PUBLICATIONS

ETSI, Telecommunications and Internet Protocol Harmonization Over Networks (TIPHON); Security; Studies into the Impact of lawful interception, 1999, ETSI, TR 101 750 V1.1.1.*

(Continued)

*Primary Examiner* — Vivek Srivastava
*Assistant Examiner* — Thomas Lauzon
(74) *Attorney, Agent, or Firm* — Schmeiser, Olsen & Watts; John Pivnichny

(57) ABSTRACT

A method and data processing system for intercepting communication between a user and a service. An authentication component receives, from the user, a user request directed to the service. The authentication component adds a user-specific token to the user request to generate a tokenized request. The tokenized request includes the user request and the token. The token includes a unique user identifier that identifies the user. The authentication component sends the tokenized request to a proxy. The proxy sends the tokenized request to the service. The proxy invokes an interceptor plug-in that is plugged into the proxy. The interceptor plug-in ascertains that the unique user identifier in the tokenized request is present in an interception control list of unique user identifiers. The interception control list is accessible to the interceptor plug-in. The interceptor plug-in sends the tokenized request to an interceptor manager who stores the tokenized request.

15 Claims, 7 Drawing Sheets

U.S. PATENT DOCUMENTS

| | | | |
|---|---|---|---|
| 2002/0049913 | A1 | 4/2002 | Lumme et al. |
| 2002/0051457 | A1 | 5/2002 | Eloranta |
| 2002/0051518 | A1* | 5/2002 | Bondy et al. .................... 379/35 |
| 2002/0068582 | A1 | 6/2002 | Zawislak |
| 2002/0078384 | A1 | 6/2002 | Hippelainen |
| 2002/0128925 | A1 | 9/2002 | Angeles |
| 2002/0129088 | A1 | 9/2002 | Zhou et al. |
| 2002/0150096 | A1 | 10/2002 | Sjoblom |
| 2002/0159578 | A1* | 10/2002 | Bern et al. .................... 379/219 |
| 2003/0078041 | A1 | 4/2003 | Dikmen et al. |
| 2004/0202295 | A1* | 10/2004 | Shen et al. ............... 379/112.01 |
| 2004/0255126 | A1* | 12/2004 | Reith ............................ 713/183 |
| 2005/0094651 | A1* | 5/2005 | Lutz et al. .................... 370/401 |
| 2005/0174937 | A1* | 8/2005 | Scoggins et al. ............. 370/230 |

OTHER PUBLICATIONS

Baker, Cisco Architecture for Lawful Intercept in IP Networks, Oct. 2004, IETF, RFC3924.*

Ganci et al., Develop and Deploy a Secure Portal Solution Using WebSphere Portal V5 and Tivoli Access Manager V5.1, Aug. 2004, IBM, International Technical Support Organization.*

ETSI, Telecommunications and Internet Protocol Harmonization Over Networks (TIPHON); Security; Studies into the Impact of lawful interception, 1999, ETSI, TR 101 750 V1.1.1.*

3GPP TS 33.108 V6.0.0 (Dec. 2002); Technical Specification; 3rd Generation Partnership Project; Technical Specification Group Services and System Aspects; 3G Security; Handover interface for Lawful Interception (Release 6); 67 pages.

3GPP TS 33.107 V5.5.0 (Dec. 2002); Technical Specification; 3rd Generation Partnership Project; Technical Specification Group Services and System Aspects; 3G Security; Lawful interception architecture and functions (Release 5); 68 pages.

3GPP TS 33.106 V5.1.0 (Sep. 2002); Technical Specification; 3rd Generation Partnership Project; Technical Specification Group Services and System Aspects; 3G Security; Lawful Interception Requirements (Release 5); 11 pages.

* cited by examiner

METHOD AND DATA PROCESSING SYSTEM FOR INTERCEPTING COMMUNICATION BETWEEN A CLIENT AND A SERVICE

FIELD OF THE INVENTION

The invention relates to a method and data processing system for intercepting communication between a client and a service in general and to a method and data processing system for intercepting communication of a suspected person between a client and a service in particular.

BACKGROUND OF THE INVENTION

In most countries communication or service providers are obliged by law to enable interception of the customers' communication for law enforcement agencies like secret services, criminal investigation departments, as well as national and international crime fighting and crime prevention organizations. Telecommunication service providers have thus to provide telecommunication and IT infrastructures in order to enable law enforcement agencies to intercept voice and data traffic. Basically the following main principles have to be assured:
1. The interception must be invisible and unrecognizable for the person whose communication is intercepted.
2. The interception must be invisible and unrecognizable for the service provider's staff.
3. Only the communication of legally determined suspect persons is allowed to be intercepted.

Whereas traditional voice communication is based on circuit switched network technologies and interception is fairly easy to achieve at the access point, IP data traffic based on packet switched technologies uncovers several obstacles with regard to the above mentioned principles. A commonly used approach for intercepting data traffic is to log all IP datagrams of several user sessions at specific interception points, doing a filter analysis afterwards in order to regenerate the complete user session. Mainly three reasons are showing the inefficiency of this practice: huge amounts of data needs to be stored, managed and analyzed. Furthermore logging of the data traffic not necessarily captures all communication data, since packet switched networks could use unpredictable routes and nodes. The interception is not real time and legal issues may be affected, since more user data is stored than needed.

Therefore interception is done in telephony networks both public switched telephony networks and public land mobile networks within the interconnecting switches. The switches are interlinked to mediation devices that are connected with law enforcement agencies. The switch uses the telephone number (ISDN/MSISDN) as interception criteria. The incoming or outgoing call for a certain telephone number is intercepted at the switch. The switch is duplicating the communication content. In addition to the transmission between caller and callee the data is transferred to the law enforcement agency via the mediation device.

In TCP/IP based networks the interception is very similar to the telephony networks. The switch is linked with the mediation device that is connected to the law enforcement agencies. Instead of a telephony number either the source address field of an IP address, the destination address field of an IP address or both are used as the interception criteria. A common practice is to capture all connection data (but not necessarily the whole content) from or towards a given IP address. There are several types of information sources from which the communications data records could be extracted for example from IP router log files, from HTTP server log files, from network protocol analyzers or from dynamic traffic filtering.

IP based interception uses a defined IP address to intercept the communication from or towards a specific IP address. However if the user has no well known/fixed IP address such as a dynamically assigned IP address provided by a third party for example an internet access provider, interception based on the IP address is insufficient. The application session established by the user to be intercepted with such IP addresses would not be captured. IP based interception could record all communication for a specific application or the whole infrastructure. However, the amount of data that would be recorded is enormous for high volume applications/websites. The management and handling of these data require massive effort and resources, for example in the form of an enormous amount of data storage devices. Since all application sessions would be intercepted in this case, privacy issues do exist and legal aspects do apply. To get the content of the applications sessions of interest out of the recorded data, filtering has to be performed. Since this involves a huge amount of data the filtering is time and resource consuming.

Furthermore, the data recorded by IP address interception can be encrypted using transport layer security protocol (TLS) or secure socket layer (SSL). The analysis of standard applications and infrastructure logs such as HTTP web server logs or application logs does not contain the whole content of the communication. To get the whole application session content the applications need to be modified to implement the required logging.

Therefore, there is a need for an improved method and data processing system for intercepting data traffic.

SUMMARY OF THE INVENTION

The present invention provides a method for intercepting communication between a user and a service, said method comprising:
receiving, by an authentication component from the user, a user request directed to the service;
adding, by the authentication component, a user-specific token to the user request to generate a tokenized request comprising the user request and the token, said user-specific token comprising a unique user identifier that identifies the user;
sending, by the authentication component, the tokenized request to a proxy;
receiving, by the proxy, the tokenized request sent by the authentication component;
sending, by the proxy, the tokenized request to the service;
invoking, by the proxy, an interceptor plug-in plugged into the proxy for processing the tokenized request;
ascertaining, by the interceptor plug-in, that the unique user identifier in the tokenized request is present in an interception control list of unique user identifiers, said interception control list being accessible to the interceptor plug-in;
sending, by the interceptor plug-in, the tokenized request to an interceptor manager; and
storing, by the interceptor manager, the tokenized request.

The present invention provides an improved method and data processing system for intercepting data traffic.

DETAILED DESCRIPTION OF THE INVENTION

Figure 1:
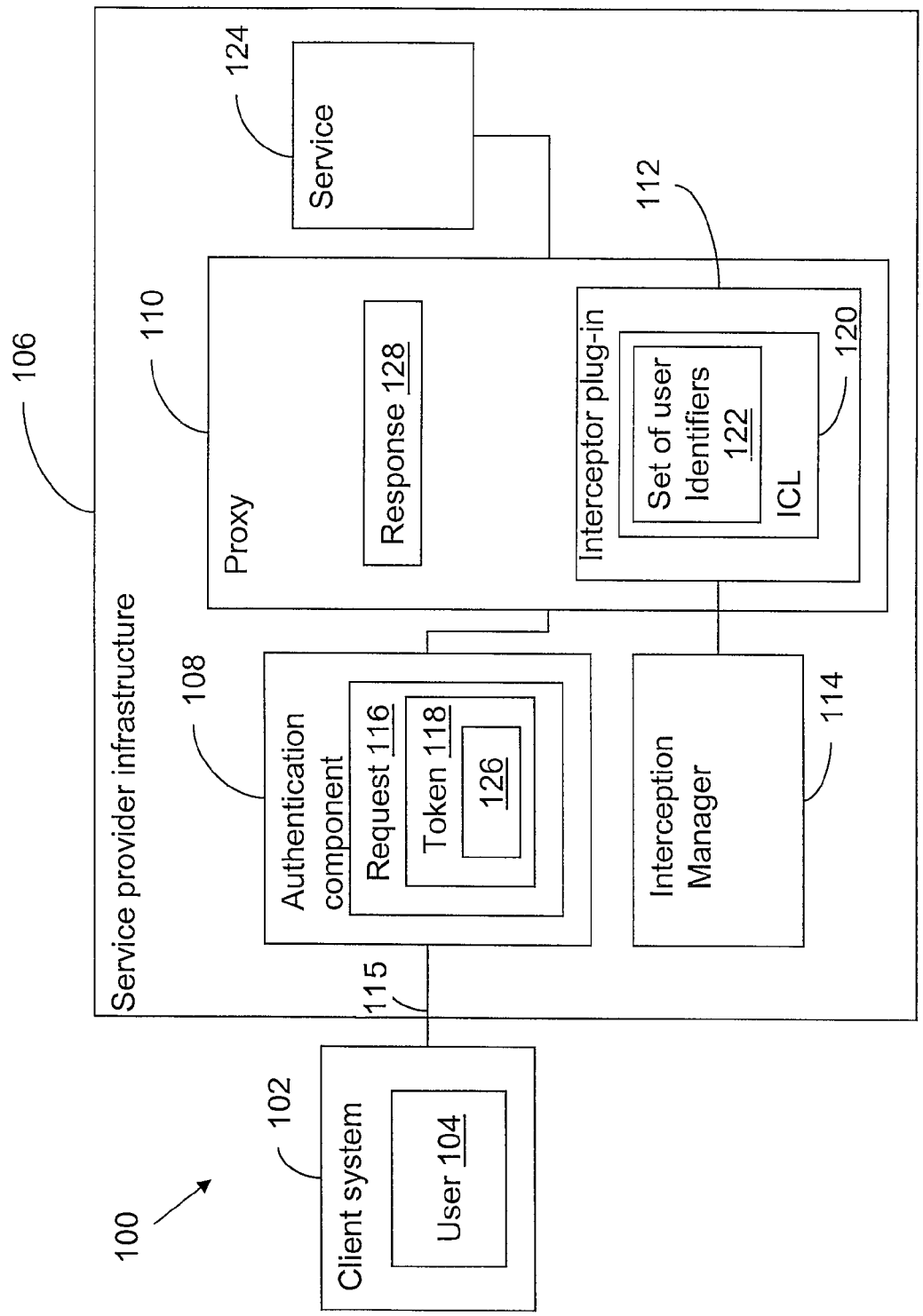
FIG. 1 shows a block diagram of a client system connected to the infrastructure of a service provider which is adapted to intercept communication, in accordance with embodiments of the present invention.

In accordance with an embodiment of the invention, there is provided a method of intercepting communication between a client and a service, wherein the method comprises the step of performing a user authentication of a user of said client and the step of receiving a request from the user of said client by the service. The request comprises a user-specific token, and the user-specific token comprises a unique user identifier. The user-specific token is assignable to the request of the user due to the user authentication. A copy of the request is stored if the unique user identifier is equal to one user identifier of a set of unique user identifiers, wherein the unique user identifier is used as a key.

A user-specific token is added to all requests that are sent from a client to a service. The user-specific token comprises a unique user identifier. By use of the user-specific token the user is identifiable. It is checked if the unique user identifier is equal to one user identifier which is comprised in a set of unique user identifiers. If this is the case, then a copy of the request is captured whereby the user identifier is used as a key in order to identify the user. Thus, eavesdropping of communication between a client and a service is carried out by comparing user identifiers that are comprised in a token with a set of unique user identifiers. In this set of unique user identifiers the user identifiers of all users that are suspect and that are to be eavesdropped are contained.

In accordance with an embodiment of the invention, the method further comprises the step of sending a response from the service to the client, wherein the response relates to the request comprising the user-specific token which comprises the unique user identifier. If the unique user identifier is equal to one user identifier of a set of unique user identifiers then a copy of the response is stored along with the unique user identifier as a key within a further step of said method.

Thus not only the requests that are sent from the client to the service are intercepted. Also the responses that are sent from the service to the client are intercepted. If the response relates to a request which comprises a token with a unique user identifier that is also comprised in the set of unique user identifiers, then the copy of the response is stored.

The method is particularly advantageous as only the requests and responses of users for which a user identifier is stored in the set of unique user identifiers is intercepted. All other users are not affected by the method in accordance with the invention. The method in accordance with the invention therefore meets the legal requirement that only the communication of legally determined persons is allowed to be intercepted. Moreover, an intercepted person does not perceive that he or she has been intercepted.

In accordance with an embodiment of the invention, the user authentication is performed by an authentication component, wherein the user-specific token is added to the request by the authentication component, wherein the unique user identifier is compared with the set of unique user identifiers by an interceptor plug-in, wherein the interceptor plug-in is plugged into a proxy, wherein the proxy is located between the service and the client, wherein the interceptor plug-in comprises an interception control list, wherein the interception control list contains the set of unique user identifiers, wherein the interceptor plug-in is linked to an interception manager, wherein the request and the response are stored on the interception manager.

The authentication component which is typically the first component of a service provider's infrastructure and which receives the message from a client authenticates the user and adds a user-specific token to the request. As mentioned above the user-specific token comprises the unique user identifier. The request is further transferred to the proxy which is located between the service and the client. An interceptor plug-in is plugged into the proxy which comprises an interception control list. The interception control list holds the set of unique user identifiers. The user identifier which is comprised in the token of the message is checked against the set of unique user identifiers. If the unique user identifier is comprised in the set of unique user identifiers then a copy of the response is stored on the interception manager. It is particularly advantageous to use an interceptor plug-in to identify if a request is sent from a user which is supposed to be intercepted, because the interceptor plug-in can simply be plugged into a proxy. This requires however that the service provider infrastructure comprises a proxy. It is also imaginable to use the interceptor plug-in within another component. For example, the interceptor plug-in could be integrated into the authentication component and moreover it is also feasible to use a separate component that hosts the interceptor plug-in. This component would then be arranged between the authentication component and the service.

In accordance with an embodiment of the invention, the request and the response are stored on a message queue, wherein the message queue is comprised in the interceptor plug-in or wherein the request and the response are stored on the interceptor plug-in, whereby the request and the response are transferred from the message queue or from the interceptor plug-in to the interception manager by an encrypted end-to-end communication.

In accordance with an embodiment of the invention, the interception control list is stored permanently on the interception manager and the interceptor plug-in is loaded into the proxy after a start-up of the proxy, and the interception control list is loaded into the interceptor plug-in from the interception manager after the start-up of the proxy.

In accordance with an embodiment of the invention, the interception control list is updated by an updated interception control list, which is loaded into the interception plug-in, thereby refreshing the stored interception control list.

In accordance with an embodiment of the invention, the response is received from the service or from the cache of the proxy.

In accordance with an embodiment of the invention, the request and the response are stored along with the corresponding unique user identifiers in an encrypted way. This ensures that access will not be granted to anybody who is not authorized to access the intercepted responses and requests.

In accordance with an embodiment of the invention, the link between the interceptor plug-in and the interception manager is an encrypted end-to-end communication. This prevents anybody who is not authorized to access the intercepted requests and responses when the intercepted responses and requests are transferred from the interception plug-in to the interception manager.

In accordance with an embodiment of the invention, the authentication component, the proxy, the interceptor plug-in, the interception manager, and the service itself are components of a service provider infrastructure or of a web hosting environment. The service relates for example but not exclusively to a server that provides a service or to an appliance box.

In accordance with an embodiment of the invention, the interception manager and the interceptor plug-in employ encryption methods for storing the interception control list. The advantage of storing the intercepted requests and responses as well as the interception control list in an encrypted way is that nobody who is not authorized to access any of these delicate data is prevented from doing so. This is particularly advantageous as it is required by law that nobody who is not authorized can access any of these delicate data. Thus the method in accordance with the invention meets the requirements as demanded by law.

In accordance with an embodiment of the invention, the interception manager is connected by a secure line to the network of a law enforcement agency, wherein only staff of the law enforcement agency is privileged to access the interception control list and the intercepted responses and requests stored on the interception manager, and wherein only selected staff of the service provider is granted access to the interception control list.

In another aspect, the invention relates to a computer program product comprising computer executable instructions stored in a computer readable medium of a data processing system, said instructions being adapted to be executed by the data processing system for performing the method in accordance with the invention.

In another aspect, the invention relates to a data processing system of intercepting communications between a client and a service, wherein the data processing system comprises means for performing a user authentication of a user of the client and means for receiving the request from the user of the client at the service, wherein the request comprises a user specific token, wherein the user specific token comprises a unique user identifier, wherein the user specific token is assignable to the user due to the user authentication. The data processing system further comprises means for storing a copy of the request and the relating response using the unique user identifier as a key if the unique user identifier is equal to one user identifier of a set of unique user identifiers.

FIG. 1 shows a block diagram 100 of a client system 102 which is connected to the infrastructure of a service provider 106 which is adapted to intercept communication, in accordance with embodiments of the present invention. The service provider infrastructure 106 comprises an authentication component 108, a proxy 110, an interception manager 114, and a service 124. A user 104 is logged into the client system 102. The client system 102 is for example a device such as a PC, a mobile phone or a PDA that runs a browser application which connects to the service provider infrastructure 106. The user 104 is known to the service provider, thus the service provider grants user 104 access to the service provider infrastructure 106.

A user request 115 is received from the client 102 by the authentication component 108. The authentication component 108 adds a token 118 comprising a user identifier 126 to the user request 115, which generates a request 116. The request 116 is a tokenized request comprising the user request 115 and the token 118. The user 104 is identifiable by the user identifier 126. The request 116 is sent to the service 124. The proxy 110 is located between the authentication component 108 and the service 124, so that the request 116 passes through the proxy 110 before it arrives at the service 124. The proxy 110 comprises an interceptor plug-in 112. The interceptor plug-in 112 is in this example a plug-in which is plugged into the proxy 110. The interceptor plug-in 112 holds an interception control list (ICL) 120 which lists a set of user identifiers 122. The interceptor plug-in 112 reads the user identifier 126 from the request 116. If the user identifier 126 is comprised in the interception control list 120, then a copy of the request 116 is sent along with the user identifier 126 to the interception manager 114 where the copy of the request 116 is stored along with the user identifier 126.

The request 116 is received by the service 124. The service 124 sends a response 128 back to the client. When the response 128 passes the proxy 110, the interceptor plug-in 112 checks if the response relates to an intercepted request. If so, then a copy of the response 128 is stored in the interception manager 114 along with the user identifier 126. The response 128 is further sent to the client system 102 so that the user 104 finally receives the response 128 in accordance to his request 116. The user 104 does not have knowledge that the request 116 might have been intercepted.

Figure 2:
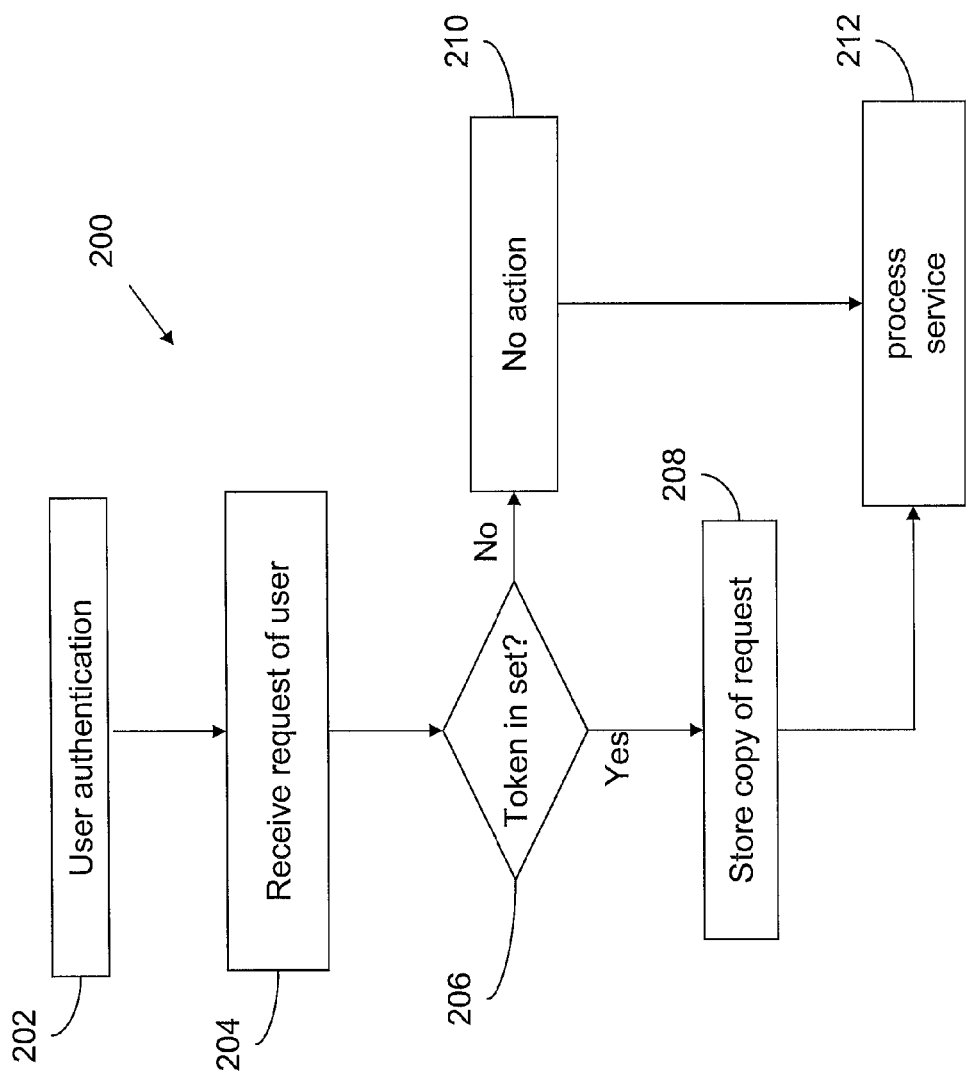
FIG. 2 shows a flow diagram illustrating the basic steps performed by the method of the present invention.

FIG. 2 shows a flow diagram 200 illustrating the basic steps performed by the method of the present invention. In step 202 a user authentication of a user of a client system is performed. In step 204, a request is received from the user of the client at the interceptor plugin wherein the received request comprises a user specific token, which comprises a unique user identifier, wherein the user specific token had been assigned to the user request of the user via the user authentication by the authentication component. In step 206 it is checked if the unique user identifier is comprised in a set of unique user identifiers. If this is the case, then the method proceeds with step 208 in which a copy of the request is stored. Otherwise the method proceeds with step 210, in which no action is further taken into account. After processing with either step 208 or 210 the request is passed along to the service where the request is processed in step 212.

Figure 3:
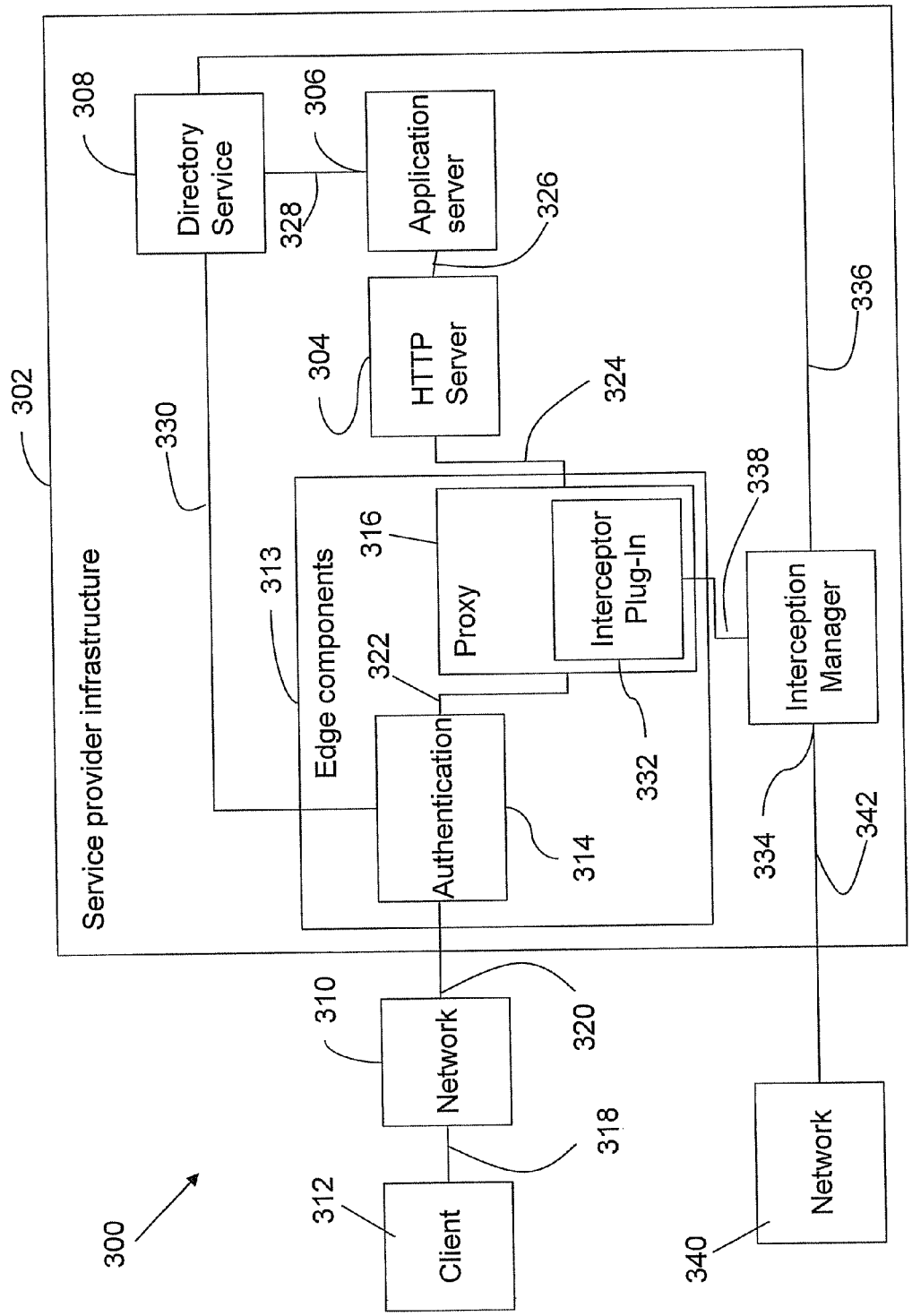
FIG. 3 illustrates in a block diagram how a common hosting environment is extended by components for interception in order to intercept data traffic between a client and a service, in accordance with embodiments of the present invention.

FIG. 3 illustrates in a block diagram 300 how a common hosting environment is extended by components for interception in order to intercept data traffic between a client 312 and a service provider infrastructure 302, in accordance with embodiments of the present invention. The notion service provider infrastructure is a very generic term and it is to be understood to refer to the infrastructure of a service provider that provides a communication service to a user in the widest sense. The service provider needs only a way to identify the user by use of an authentication component as described previously. The following discussion focuses on the infrastructure of a service provider that is not identical to the infrastructure provided by a communication service provider. Commonly a communication service provider authorizes the access of a user by use of a dynamic IP address assigned to the client and enables the communication to an IP network. On the other side a service provider has a fixed IP address and a well-known domain name which is used to reach the services which can for example be an online banking service or in the wider sense a web service on the same IP network.

The client 312 can be a device with a browser application which connects via the network 310 to the service provider infrastructure 302, which is also referred to as service provider premises. The client 312 could also be a telephone utilizing an interactive voice response (IVR) system including a voice browser (such as a VoiceXML browser) to which service is provided by the service provider infrastructure 302 over the network 310. Voice browsers apply web technologies to enable users to access services from the telephone via a combination of speech and dual tone multi-frequency (DTMF).

The network 310 can be a representative entity for all types of access channels that are provided by a communication service provider. As mentioned above, the service provider and the communication service provider are typically not identical. This means that the service provider is not aware about user details except the client's IP address. The service provider cannot identify or authenticate the user without the help of the communication service provider. Because of this fact, most web applications provided by a service provider, such as for example online banking, require users to authenticate themselves when accessing the service.

The service provider infrastructure 302 usually consists of three components, the HTTP server 304, the application server 306, and the directory service 308. Furthermore, the service provider infrastructure usually comprises so called edge components 313, which comprise an authentication component 314 and a proxy 316.

The client 312 connects via connections 318 and 320 over the network 310 to the service provider infrastructure 302. A user request from the client 312 is received at the authentication component 314. The authentication component 314 is verifying credentials against the directory service 308 via the connection 330. The authentication component 314 forwards only the requests that can be authenticated via connections 322, 324, and 326, to the proxy 316, the HTTP server 304 or the application server 306.

The authentication component 314 adds further a user specific token to the user request. The user specific token comprises a unique user identifier by which the user can be identified uniquely.

The request comprising the user request and the added token is passed on by authentication component 314 to proxy 316. The proxy 316 comprises an interceptor plug-in 332, which analyses the token and which checks the user identifier against a set of user identifiers that are listed in the interception control list. If the user identifier is listed in the interception control list, then a copy of the request is stored for example in the cache of the interceptor plug-in.

The request is further transferred to the HTTP server 304 and to application server 306, whereby the connection 328 to the directory service 308 is used for authorization purposes and user details. A response is generated from the application server 326, which is then sent via HTTP server 304 and the edge components 313 back to the client system 312. The request could also partly or completely be generated directly by the proxy 316, if it has been requested before.

The interceptor plug-in 332 of the proxy 316 also analyses if the response relates to a request with a user identifier of the token that is also comprised in the set of user identifiers that are listed in the interception control list. If the user identifier is listed in the interception control list, then a copy of the response is stored for example in the transient memory of the interceptor plug-in.

The requests and response that are intercepted are typically stored in the transient memory of the interceptor plug-in in an encrypted way, so that unauthorized service staff of the service provider cannot access the requests and responses. Moreover the interception control list is stored in an encrypted way for the same reasons.

The interception manager 334 is connected via connection 338 to the proxy 316 and can directly communicate with the interceptor plug-in 332. Connection 338 can be used to establish an encrypted end-to-end communication between the interceptor plug-in 332 and the interception manager 334. The connection 338 can be for example established periodically and the requests as well as the responses stored in the transient memory of the interceptor plug-in 322 could then be transferred from the interceptor plug-in 332 to the interception manager 334.

Alternatively, the connection 338 could be established permanently and the intercepted response and requests could be directly transmitted from the interceptor plug-in 332 to the interception manager 334, where they would be stored permanently in an encrypted way. The interception control list is also stored in the interception manager 334 in an encrypted way.

Moreover, a message queue could be used between the interceptor plug-in and the interception manager component in order to improve the availability and serviceability. In doing so, assured delivery between interceptor plug-in 332 and interception manager 334 is achieved and loss of data is avoided in the case of service outages.

The interception manager 334 is communicating with network 340 via connection 342. Connection 342 is preferably also an encrypted end to end connection which is established permanently or temporary. Network 340 is controlled by a law enforcement agency. The intercepted responses and requests can be transferred from the interception manager to the network 340 for further analysis by authorized staff of the law enforcement agency.

As has been mentioned before, a user specific token is added to all requests received from a client to which the user specific token relates to assesses the service provider infrastructure. The user specific token is checked with user identifiers comprised in the interception control list. The user identifiers are known to the service provider. Thus the law enforcement agency has to authorize a few persons from the staff of the service provider which help to set up the interception control list, since these persons have to provide the user specific identifiers.

Figure 4:
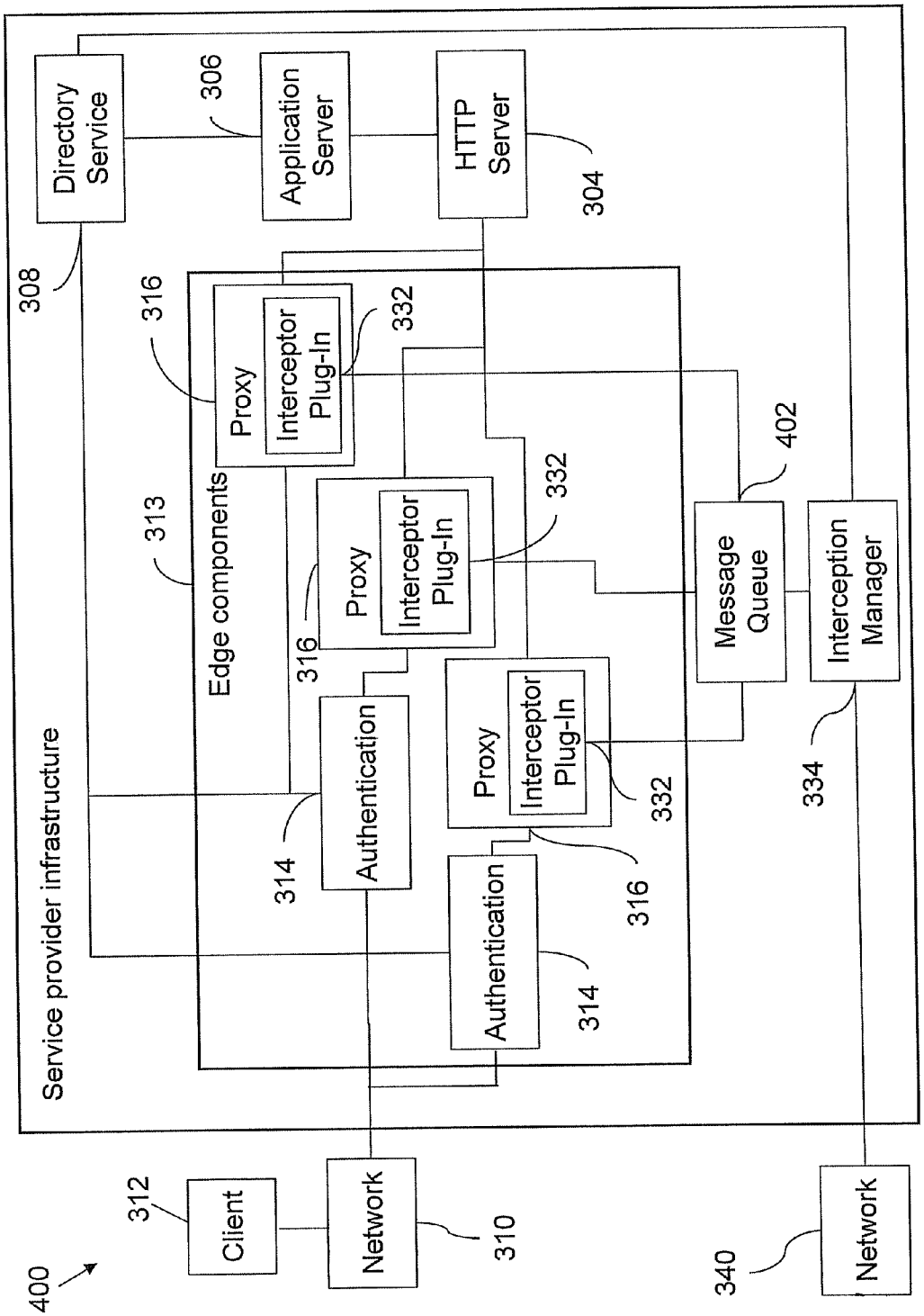
FIG. 4 shows a block diagram of a scaleable setup of the interception facility, in accordance with embodiments of the present invention.

FIG. 4 shows a block diagram 400 of a scaleable setup of the interception facility, in accordance with embodiments of the present invention. The setup is basically the same as described in FIG. 3 and the method in accordance with the invention for intercepting user requests and responses is also identical. Horizontal scaling techniques are applied for the authentication component 314, the proxy 316 an and the corresponding interceptor plug-ins 332. A message queue 402 is placed between the interceptor plug-ins 332 and the interception manager 334. The message queue 402 is used between the interceptor plug-ins 332 and the interception manager component 334 in order to improve the availability and serviceability as described above.

Figure 5:
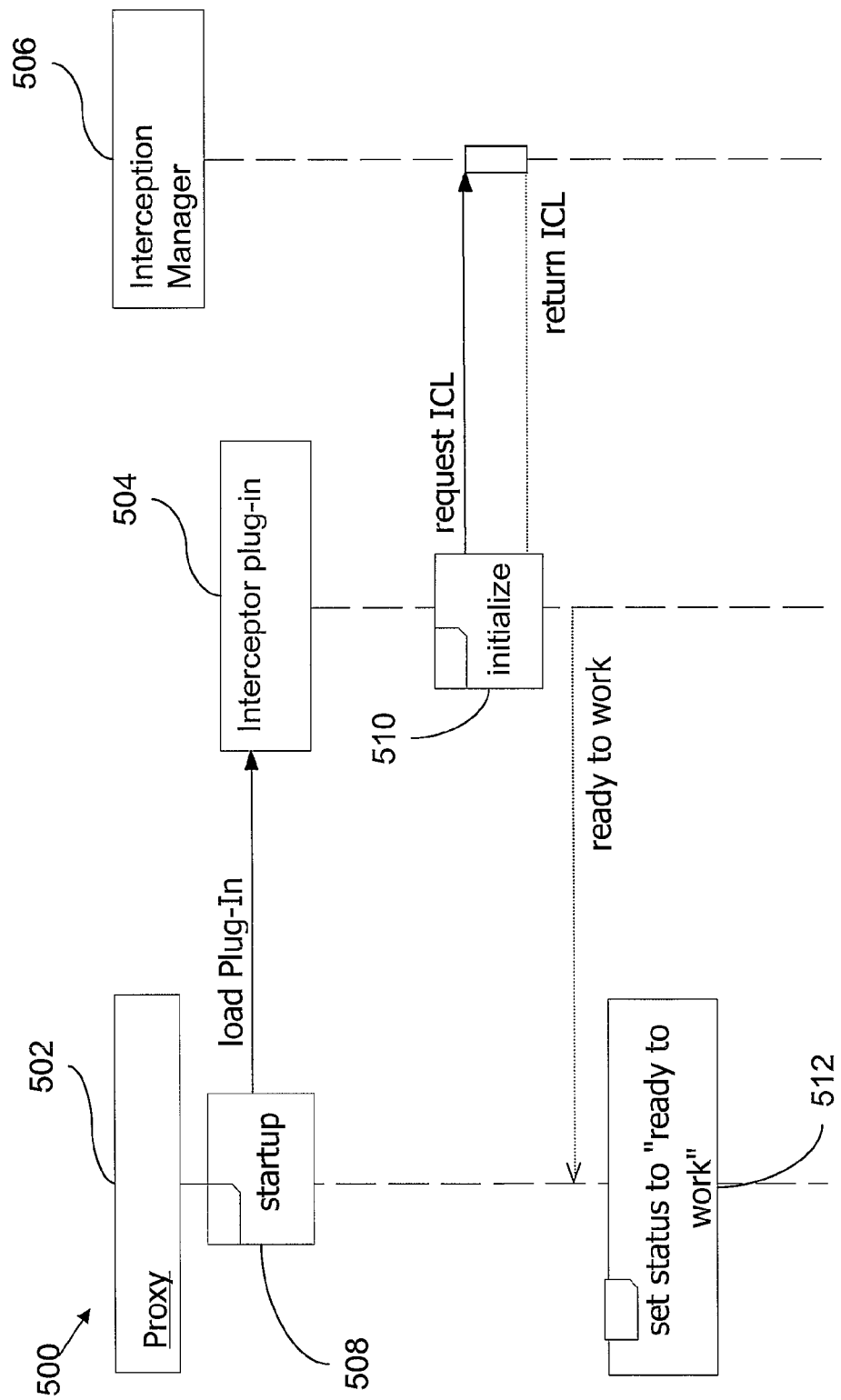
FIG. 5 is a sequence diagram showing the steps that are processed by various components during the start up of the interceptor plug-in, in accordance with embodiments of the present invention.

FIG. 5 is a sequence diagram 500 showing the steps that are processed by various components, the proxy 502, the interceptor plug-in 504, and the interception manager 506 during the start up of the interceptor plug-in 504, in accordance with embodiments of the present invention. In step 508, the proxy 502 is started up. The interceptor plug-in 504 is loaded into the proxy. It is plugged into the proxy 502. In step 510 the interceptor plug-in initializes itself It requests the interception control list from the interception manager 506, which is loaded into the transient memory of the interceptor plug-in 504. The interceptor plug-in 504 sends a "ready to work"

signal back to the proxy 508. The start-up of the proxy 508 is completed and the proxy sets its status to "ready to work" in step 512.

Figure 6:
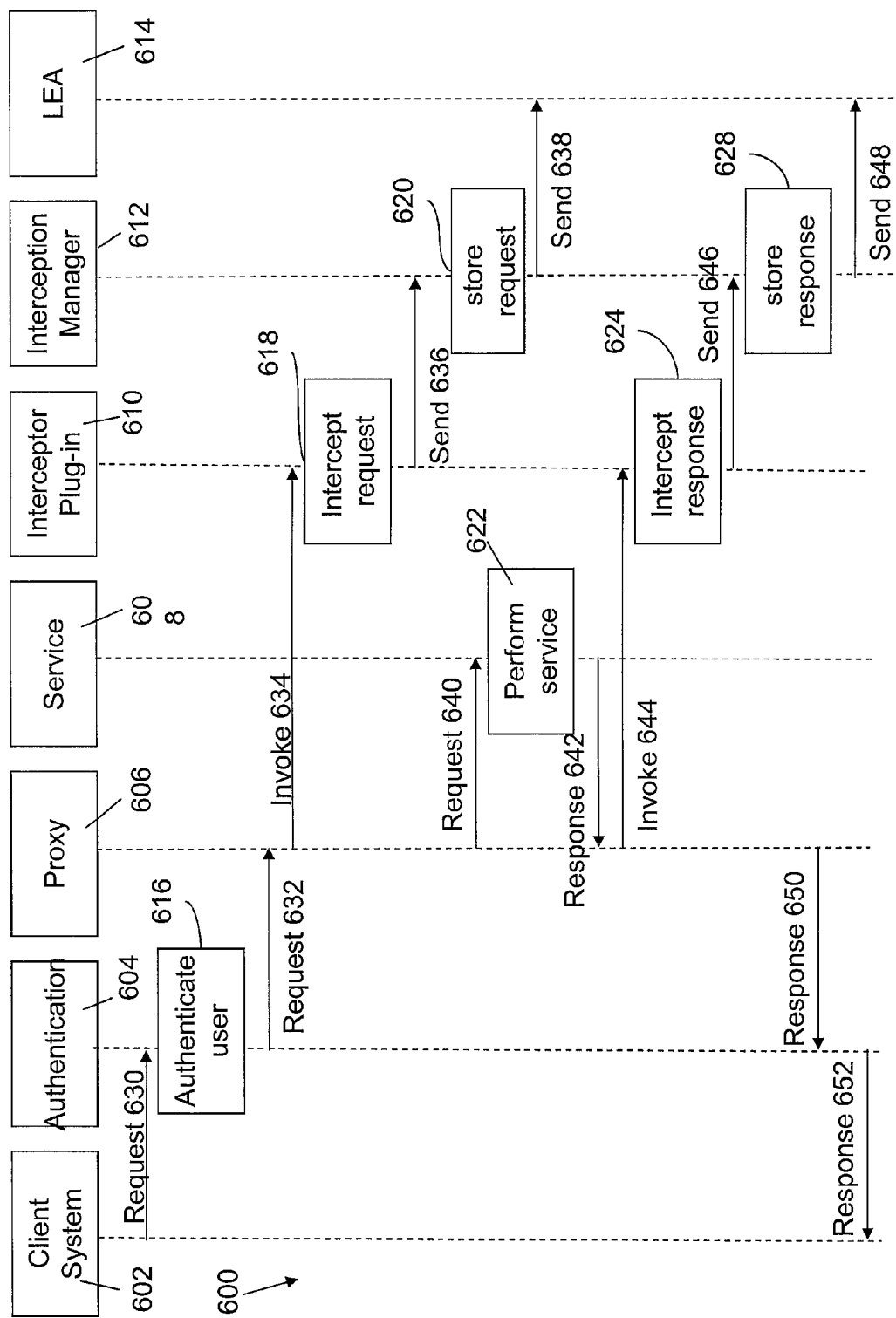
FIG. 6 is a sequence diagram illustrating interactions of various components when the communication is intercepted, in accordance with embodiments of the present invention.

FIG. 6 is a sequence diagram 600 illustrating interactions of various components, the client system 602, the authentication component 604, the proxy 606, the service 608, the interceptor plug-in 610, the interception manager 612, and the law enforcement agency (LEA) 614 when the communication of a suspicious user is intercepted, in accordance with embodiments of the present invention.

The client 602 sends a user request to the authentication component 604 in step 630. The authentication component 604 authenticates the user in step 616, adds the user specific token with the user identifier to the user request, and sends the request comprising the user request and the added token to the proxy 606 in step 632. The interceptor plug-in 610 is invoked in step 634. The user identifier is checked against the interception control list, and if it is hold in the interception control list, the request is intercepted by the interceptor plug-in in step 618. A copy of the intercepted request is sent in step 636 to the interceptor manager 612, which stores the intercepted request in step 620. The request is further sent in step 638 to the law enforcement agency 614, or to be more precisely, to the network of the agency.

In step 640, the proxy 606 also forwards the request to the service 608, where in step 622 the service itself is performed. A response relating to the request, is sent from the service back to the proxy 606 in step 642. The proxy invokes in step 644 the interceptor plug-in. In step 624, the response too is intercepted by the interceptor plug-in if the response relates to an intercepted request. A copy of the intercepted response is sent in step 646 to the interception manager 612, where the intercepted response is stored in step 628. It is further sent to the law enforcement agency 614 in step 648. The proxy 606 also forwards the response to the authentication component 604 in step 650 from where the response is sent to the client in step 652. The user receives the response without knowing that the response might have been intercepted.

Figure 7:
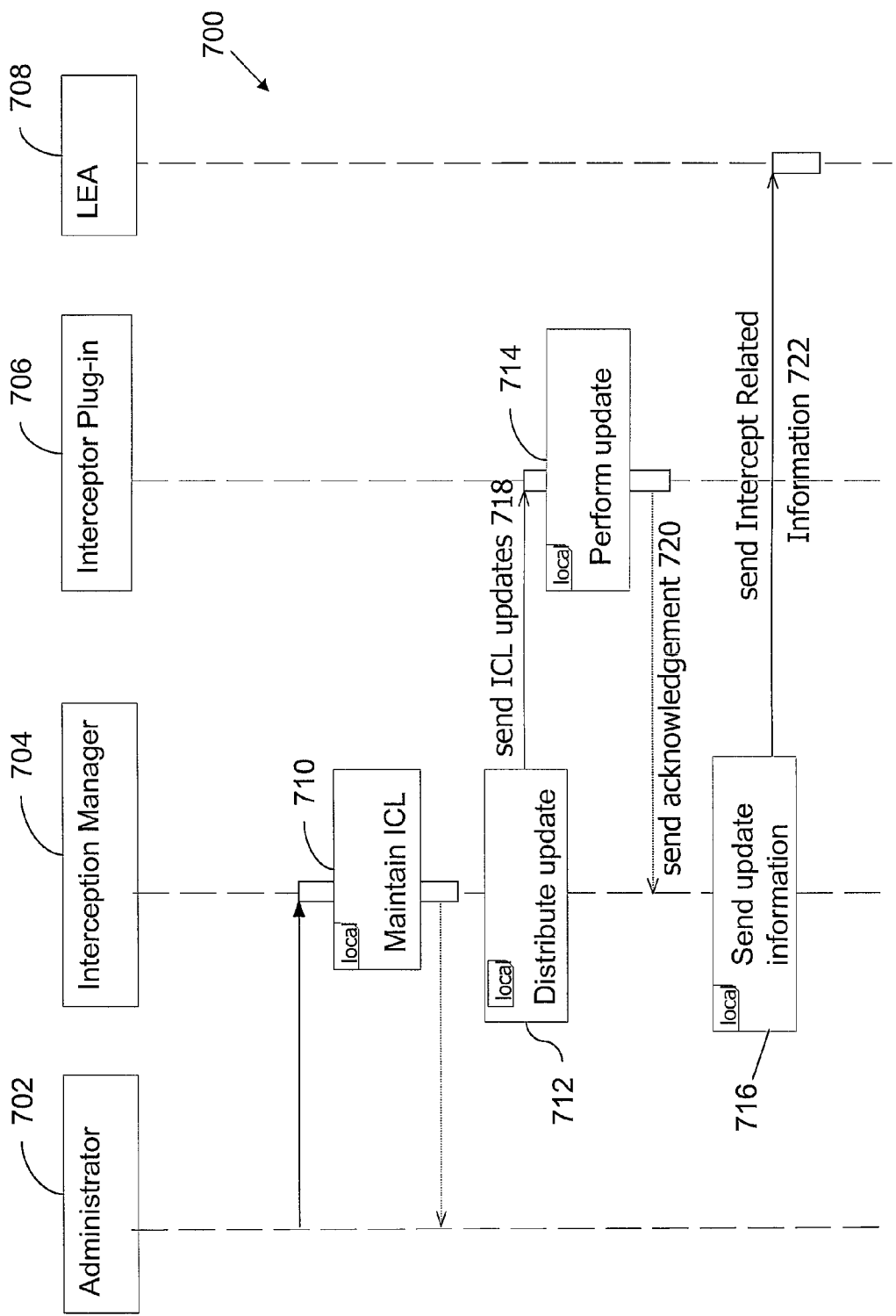
FIG. 7 shows a sequence diagram illustrating the steps that are performed when the interception control list is updated, in accordance with embodiments of the present invention.

FIG. 7 shows a sequence diagram 700 illustrating the steps performed to update the interception control list (ICL), in accordance with embodiments of the present invention. In step 710, an authorized administrator 702 maintains and updates the interception control list stored (ICL) on the interception manager 704. The updated interception control list is distributed in step 712. In step 718 the interception control list is sent to the interceptor plug-in 706. In step 714 the updated interception control list refreshes the stored interception control list. In step 720, a message notifying the interception manager 704 that the update has been successfully carried out is sent from the interceptor plug-in 706 to the interception manager 704. In step 716, an update information is sent to the law enforcement agency (LEA) 708. In step 722, the LEA 708 is informed about the enablement of the changes to the interception control list (ICL).

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of intercepting communication between a user and an application server, said method comprising:

an authentication component receiving, from a client system, a user request of a user logged into the client system, said user request being directed to the application server, said authentication component being disposed between the client system and a proxy;

after said authentication component receiving the user request, said authentication component authenticating the user through use of a directory service to which both the application server and the authentication component are directly connected, wherein a service provider infrastructure comprises the application server and the directory service;

after said authenticating the user through use of the directory service, said authentication component adding a user-specific token to the user request to generate a tokenized request comprising the user request and the token added thereto, said user-specific token comprising a unique user identifier that identifies the user uniquely;

said authentication component sending the tokenized request to the proxy;

said proxy receiving the tokenized request sent by the authentication component;

said proxy sending the tokenized request received from the authentication component to the application server via a HTTP server disposed between the proxy and the application server, wherein the directory service is configured to be used by the application server for authenticating the user;

after said sending the tokenized request from the proxy, said proxy receiving a response to the user request from the application server;

after said proxy receiving the response from the application server, said proxy forwarding the response to the authentication component;

said authentication component receiving the response sent by the proxy and subsequently sending the response to the client system;

said proxy invoking an interceptor plug-in plugged into the proxy for processing the tokenized request received by the proxy from the authentication component;

storing, in an interceptor manager, an interception control list comprising a plurality of unique user identifiers, said interceptor manager being external to and coupled to the interceptor plugin;

said interceptor manager sending the interception control list to the interceptor plug-in;

said interceptor plug-in receiving the interception control list sent by the interceptor manager;

loading, into the interceptor plug-in, the interception control list received by the interceptor plug-in from the interceptor manager;

after said loading the interception control list, said interceptor plug-in ascertaining that the unique user identifier in the tokenized request is present in the interception control list loaded into and accessible to the interceptor plug-in;

after said ascertaining, said interceptor plug-in sending the tokenized request to an interceptor manager; and said interceptor manager storing the tokenized request;

said interceptor manager transferring the tokenized request to a network controlled by a law enforcement agency for further analysis by the law enforcement agency, said network being directly connected to the interceptor manager and external to the service provider infrastructure.

2. The method of claim 1, wherein said interceptor manager storing the tokenized request comprises said interceptor manager storing the tokenized request via a message queue disposed between the interceptor plug-in and the interceptor manager.

3. The method of claim 1, wherein said storing the tokenized request comprises storing the tokenized request in an encrypted way.

4. The method of claim 1, wherein the method further comprises said interceptor plug-in storing the tokenized request in a transient memory of the interceptor plug-in.

5. The method of claim 1, wherein the method further comprises said interceptor plug-in storing the tokenized request in a cache of the interceptor plug-in.

6. The method of claim 1, wherein said storing the interception control list in the interceptor manager comprises storing the interception control list in the interceptor manager in an unencrypted way.

7. The method of claim 1, wherein said storing the interception control list in the interceptor manager comprises storing the interception control list in the interceptor manager in an encrypted way.

8. The method of claim 1, wherein the method further comprises:
   said proxy invoking the interceptor plug-in for processing the response; and
   said interceptor plug-in determining that the response relates to the user request.

9. The method of claim 8, wherein the method further comprises storing the response in a transient memory of the interceptor plug-in in an unencrypted way.

10. The method of claim 8, wherein the method further comprises storing the response in the transient memory of the interceptor plug-in in an encrypted way.

11. The method of claim 8, wherein the method further comprises said proxy sending the response to the interceptor manager.

12. The method of claim 11, wherein the method further comprises storing the response in the interceptor manager.

13. The method of claim 11, wherein the method further comprises said interceptor manager sending the response to the law enforcement agency.

14. A computer program product comprising computer executable instructions stored in a tangible, non-transitory computer readable medium of a data processing system, wherein said instructions are configured to be executed by the data processing system to perform the method of claim 1.

15. A data processing system comprising a tangible, non-transitory computer readable medium on which computer executable instructions are stored, wherein said instructions are configured to be executed to perform the method of claim 1, said data processing system further comprising the authentication component, the proxy, and the interceptor manager.

\* \* \* \* \*